United States Patent
Lange et al.

(10) Patent No.: US 8,694,281 B2
(45) Date of Patent: Apr. 8, 2014

(54) METHOD AND DEVICE FOR DETERMINING THE OUTLET CROSS-SECTION OF A COMPONENT OF A GAS TURBINE

(75) Inventors: Anja Lange, Langenhagen (DE); Jens-Heiko Perleberg, Hannover (DE)

(73) Assignee: MTU Aero Engines GmbH, Munich (DE)

( * ) Notice: Subject to any disclaimer, the term of this patent is extended or adjusted under 35 U.S.C. 154(b) by 559 days.

(21) Appl. No.: 12/520,952

(22) PCT Filed: Dec. 12, 2007

(86) PCT No.: PCT/DE2007/002243
§ 371 (c)(1),
(2), (4) Date: Jun. 23, 2009

(87) PCT Pub. No.: WO2008/077373
PCT Pub. Date: Jul. 3, 2008

(65) Prior Publication Data
US 2010/0030514 A1 Feb. 4, 2010

(30) Foreign Application Priority Data

Dec. 23, 2006 (DE) .......................... 10 2006 061 446

(51) Int. Cl.
*G01B 21/04* (2006.01)
*G01B 21/20* (2006.01)
*G01B 11/24* (2006.01)

(52) U.S. Cl.
USPC .............. 702/156; 702/34; 702/155; 702/167

(58) Field of Classification Search
USPC ..................................... 702/34, 155, 156, 167
See application file for complete search history.

(56) References Cited

U.S. PATENT DOCUMENTS

| | | |
|---|---|---|
| 4,327,495 A | 5/1982 | Plante |
| 4,896,430 A | 1/1990 | Burton |
| 2002/0193897 A1 | 12/2002 | Burdgick |
| 2007/0050172 A1* | 3/2007 | Frost et al. .................... 702/156 |

* cited by examiner

*Primary Examiner* — Sujoy Kundu
*Assistant Examiner* — L. Anderson
(74) *Attorney, Agent, or Firm* — Greer, Burns & Crain, Ltd.

(57) ABSTRACT

A method for determining the outlet cross-section of a component including one or more turbine blades, in particular of a turbine blade twin, of a gas turbine, in which at least one closed outlet cross-section is measured between the turbine blades, and/or respective open outlet cross-sections are measured on the side of the at least one turbine blade, using a measurement device, wherein in order to determine the corresponding outlet cross-section its respective bounding walls are traversed by the measurement device along a measurement line.

18 Claims, 3 Drawing Sheets

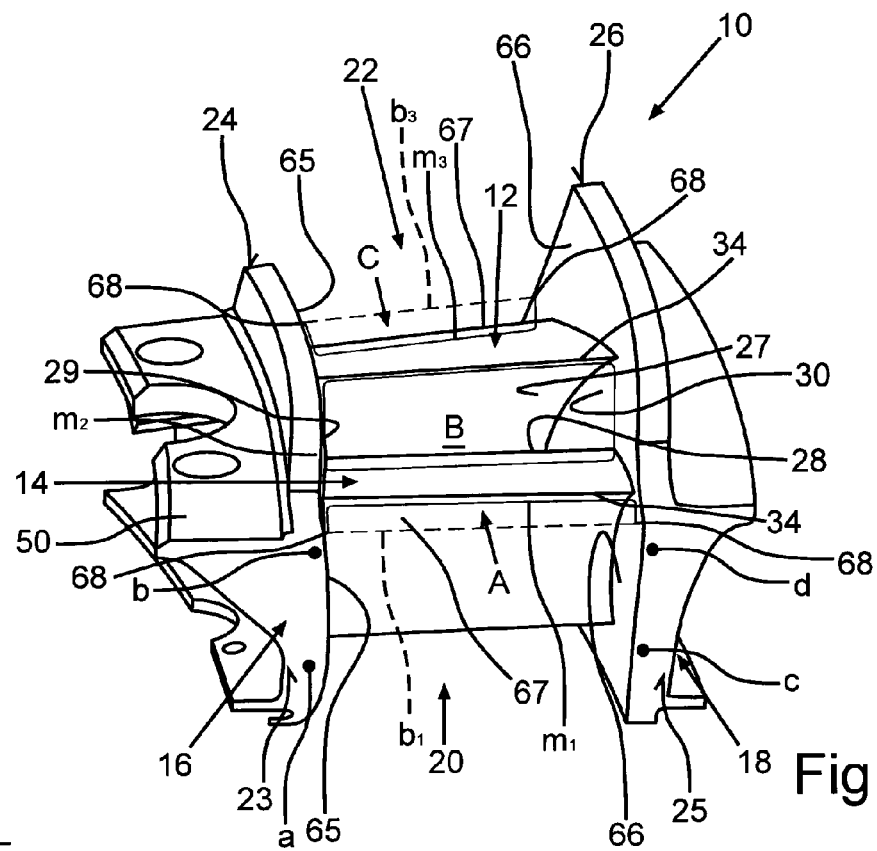
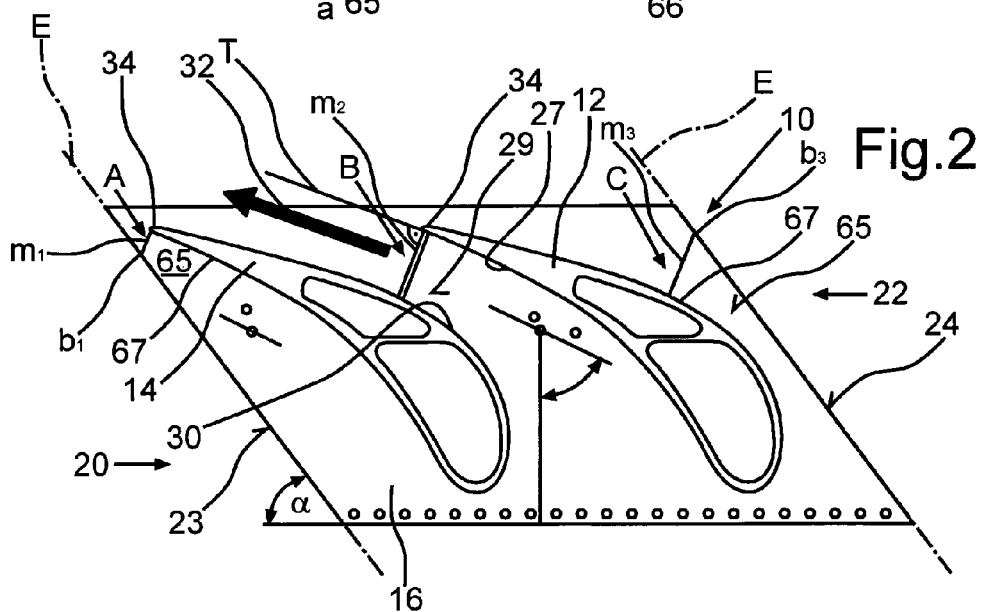

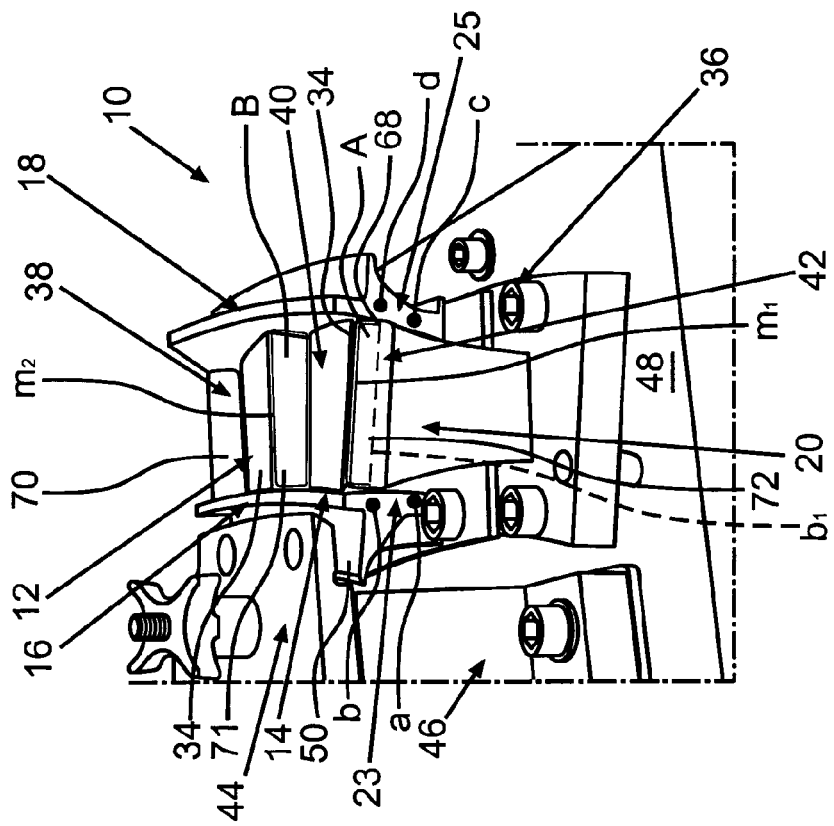
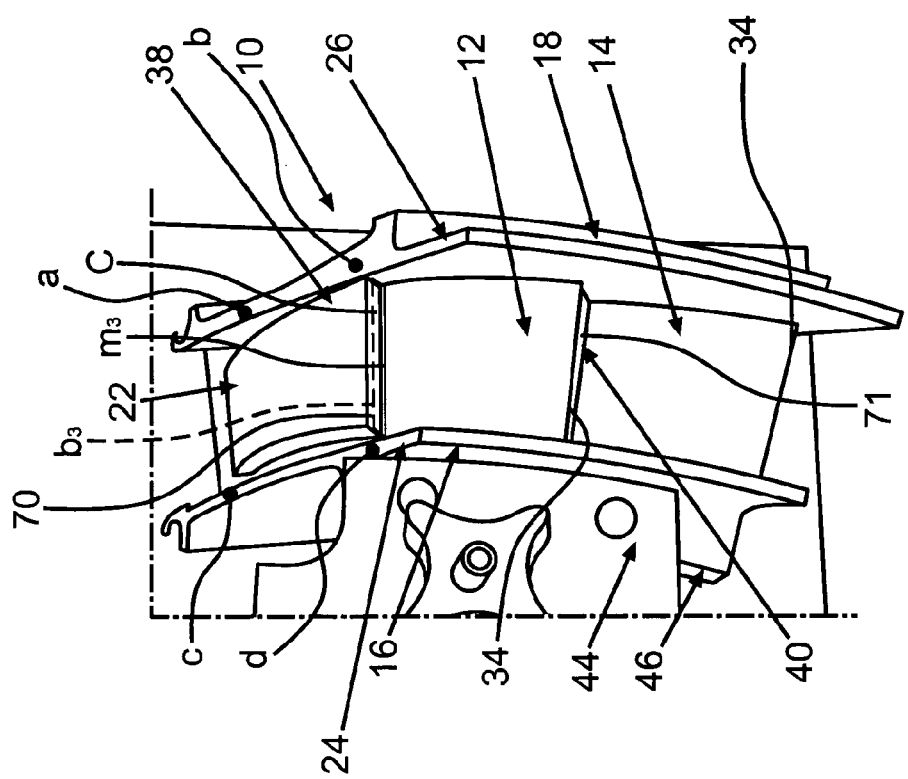
Fig.6
Fig.7

METHOD AND DEVICE FOR DETERMINING THE OUTLET CROSS-SECTION OF A COMPONENT OF A GAS TURBINE

The present invention relates to a method and to a device for determining the outlet cross-section of a component comprising one or more turbine blades, in particular of a turbine blade twin, of a gas turbine of the type indicated in the preambles of patent claims 1 and 13.

Such turbine blade twins, also called vane twins, are fashioned for example as components essentially having the shape of a circular ring segment, forming, together with a plurality of other turbine blade twins, a guide blade ring, for example in the high-pressure turbine part of a jet engine. Here, each of the turbine blade twins preferably comprises two turbine blades bound by a radially inner or outer platform. The turbine blade twins, which are stationary inside the high-pressure turbine part, and in particular the turbine blades themselves, are subject to high thermal and mechanical stress during operation of the gas turbine, resulting in wear to the turbine blades, in particular on the rear outlet edges thereof.

An essential factor in engine power is the outlet cross-section, or the narrowest cross-section of the turbine blades acting as nozzles. The surface of this outlet cross-section is influenced by the wear on the turbine blades, and must correspondingly be corrected from time to time, for example by a local application of material on the turbine blades. The outlet cross-section, or the narrowest cross-section between two turbine blades, is measured from the concave side of the one turbine blade to the convex side of the turbine blade adjacent thereto. The outlet cross-section here runs in a plane that runs perpendicular to the trailing direction and at the height of the outlet edge of the respective turbine blade. The trailing direction and the outlet angle result here as tangents to the concave side of the respective turbine blade at its rear edge.

In the determination of the outlet cross-sections of turbine blade twins, a distinction is to be made in particular between a closed outlet cross-section between the two adjacent turbine blades of the turbine blade twin and open outlet cross-sections that extend along the sides of the associated turbine blades. Together with the adjacent open outlet cross-section of the component connected thereto, these open outlet cross-sections form an overall outlet cross-section that corresponds at least approximately to the surface of the closed outlet cross-section between the two turbine blades. If the two open outlet cross-sections of each component are accordingly summed, the surface thereof also corresponds approximately to the surface of the closed outlet cross-section between the two turbine blades.

Because each component is measured separately, up to now it has turned out to be extremely problematic to measure the outlet cross-sections of each of the components with a high degree of reproducibility or repeatable precision. Currently, this is done using a mechanical measurement clock with which punctiform measurement values are recorded in the area of each outlet cross-section. Here, for example radii of the outlet cross-section are not taken into account. Another problem up to now has been the measurement of the open outlet cross-sections, because these do not have a corresponding bounding wall toward the respective appertaining front face of the component.

Therefore, the object of the present invention is to create a method and a device of the type named above with which each of the outlet cross-sections of the component can be measured more precisely and with a higher degree of reproducibility.

In order to enable each of the outlet cross-sections of the component to be measured with significantly greater precision and reproducibility, in the method according to the present invention it is provided that in order to determine the corresponding outlet cross-section, each of the bounding walls thereof are traversed or scanned along a measurement line by means of the measurement device. In other words, in the method according to the present invention it is provided that the measurement device, for example a sensing head, is used to traverse or scan the bounding walls of the appertaining outlet cross-section along a continuous measurement line.

Using such a continuous measurement line, in this way changes in shape of the bounding walls, caused by the component, of each outlet cross-section, for example in the area of radii, can be acquired with significantly greater precision, so that a more precise value can be realized. In addition, such a measurement line can be traversed in a significantly more reproducible manner than is the case if, for example, only a plurality of measurement points are recorded.

In this context, it has turned out to be particularly advantageous if, using a computer unit, associated measurement values are recorded during the traversing or scanning of the measurement line. In this way, a measurement interval can be determined in a simple manner in which the computer unit is used to record the appertaining measurement values during the traversing or scanning of the measurement line. Accordingly, using the computer unit it can be determined at what times, or at what points on the measurement line, a measurement value is to be recorded that is used to calculate the surface of the outlet cross-section. In addition, the specification of the measurement interval makes it possible to regulate the precision or reproducibility of the measurement method.

In order to measure the closed outlet cross-section between the turbine blades, it has turned out to be particularly simple if the measurement device, or its sensing head, is guided along the bounding walls on the outer circumference in a circulating closed measurement line. Such a measurement line can be traversed easily by the sensing head of the measurement device, and ensures a high degree of reproducibility of the measurement process.

If, on the other hand, one of the open outlet cross-sections on the side of the respectively appertaining associated turbine blade is to be measured, it has proved particularly successful to guide the measurement device, or its sensing head, along the boundary walls in an open measuring line between beginning and end points that are situated at a distance from one another. Here, the beginning point and the end point of the measurement line are selected in the area of the respective front face of the component.

In order to achieve a particularly precise calculation of the open outlet cross-section on the side of each appertaining turbine blade, in a further construction of the present invention it has turned out to be particularly advantageous if the computer unit is used to determine a plane on the front face of each component, the plane being used in each case to determine a bounding line of the associated open outlet cross-section. Here, the plane on the front face of each component can be easily determined by determining a plurality of measurement points in the area of the front faces of an inner and an outer platform of the component, the corresponding plane being determinable by the computer unit via the measurement points. Because on the one hand a plane is determined on the front face of the component and on the other hand the associated open outlet cross-section is traversed by means of the open measurement line, in this way the computer unit can be used to determine the bounding line of the open outlet cross-section toward the open side of the component in an extremely precise and reproducible manner. The surface of the open cross-section can also be determined with precision or reproducibility corresponding to that of the open outlet cross-section.

In a further construction of the present invention, in this connection it has turned out to be advantageous if the measurement points in the area of the respective front face of the inner and outer platform of the component are determined before the respective appertaining open measurement line of the corresponding open outlet cross-section is traversed or scanned. Because in this way the plane is already defined at the front face of the component before the appertaining open measurement line is traversed, its beginning point and end point, or a first and last measurement point, can be determined with a very high degree of precision.

In a further construction of the present invention, it has turned out to be advantageous if the measurement device for determining the respective measurement line and/or for determining the plurality of measurement points in the area of the front face is moved along the component by hand. In this way, a sufficiently fast measurement method can be ensured, corresponding stops being used to ensure that the movement of the measurement device by hand takes place with sufficient precision.

In addition, a particularly precise method can be achieved if the component is fixed using a mounting device before the determination of the measurement line and/or the determination of the plurality of measurement points. By means of the fixing using the mounting device, it can be ensured that a reproducible measurement takes place, in particular if the measurement device is guided by hand.

In order in particular to enable the measurement of the closed cross-section, or of the at least two open outlet cross-sections, or the traversing or scanning along the open or closed measurement line, to be carried out with sufficient precision, in a further construction of the present invention it has turned out to be advantageous if the plane of the respective outlet cross-section is specified by means of an allocated stop of the mounting device.

Finally, in the method according to the present invention it has turned out to be advantageous if the two open outlet cross-sections are summed to form an overall outlet cross-section whose size corresponds at least approximately to that of the closed outlet cross-section. In the component fashioned as a turbine blade twin, this means that in this way two overall outlet cross-sections are determined. Here, the one value results from that of the closed outlet cross-section between the two turbine blades, and the other value results from the sum of the two open outlet cross-sections on the sides of each turbine blade. Thus, the overall outlet cross-section of a turbine blade ring can be determined by adding together the outlet cross-sections of each individual turbine blade twin.

The advantages described above in connection with the method according to the present invention also hold for the device according to the present invention. This device is characterized in particular in that its measurement device is connected to a computer unit via which the measurement values obtained by traversing the bounding walls along the measurement line are to be evaluated.

In addition, the device according to the present invention comprises a mounting device within which the component can be fixed for the reproducible determination of the respective outlet cross-sections. In particular, here the mounting device comprises at least one stop that runs perpendicular to an allocated outlet angle, and extends in the plane of the respective outlet cross-section. Such a stop makes it possible to guide the measurement device, or its sensing head, along the bounding walls of the respective outlet cross-section by hand with an extremely high degree of precision and reproducibility. In this connection, it has turned out to be particularly advantageous if the mounting device has a stop for each of the outlet cross-sections of the component, so that in one sequence all the outlet cross-sections can be measured, for example by hand, with extreme precision and reproducibility along each appertaining open or closed measurement line.

Finally, it has turned out to be advantageous if the measurement device is calibrated using a calibrating component and/or a calibrating cone. In this way, it is ensured in a simple manner that the measurement of the respective components, or of their respective outlet cross-sections, can take place without significant measurement error.

Further advantages, features, and details of the present invention result from the following description of a preferred exemplary embodiment, and on the basis of the drawings.

FIG. 1 shows a schematic perspective view of a component of a gas turbine in the form of a turbine blade twin that comprises two turbine blades that extend between an inner and an outer platform, a closed outlet cross-section being visible between the two turbine blades and open outlet cross-sections being visible on the sides of the respective turbine blades, toward the front face of the component, that are measured along a closed or open measurement line;

FIG. 2 shows a schematic sectional view through the turbine blade twin according to FIG. 1, the position of the open, or of the two closed, outlet cross-sections being visible;

FIG. 6 shows a schematic and slightly perspective front view of the mounting device (partly visible) with the turbine blade twin fixed thereon, for the explanation of the determination of the closed outlet cross-section between the two turbine blades and the determination of one of the two open outlet cross-sections on the one front face of the turbine blade twin;

FIG. 7 shows a schematic and perspective top view of the mounting device (partly visible) with the turbine blade twin according to FIG. 6 fixed thereon, for the explanation of the determination of the second open outlet cross-section on the other front face of the turbine blade twin.

Figure 3:
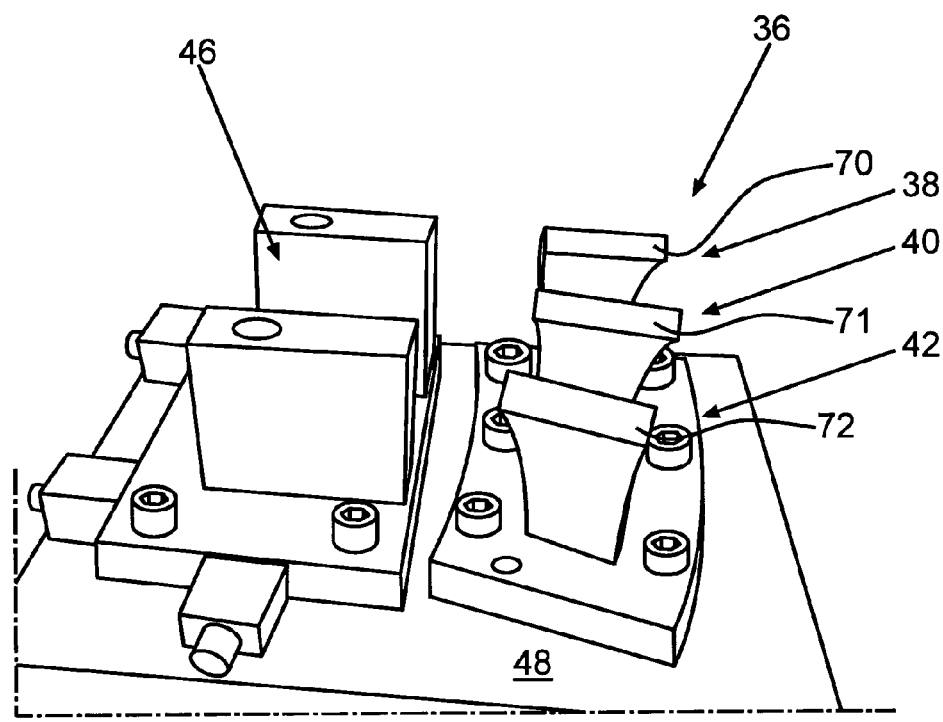
FIG. 3 shows a schematic perspective view of a part of a mounting device for fixing the turbine blade twin according to FIGS. 1 and 2, the mounting device having three stops that run perpendicular to a respective outlet angle and that extend in the plane of the respective outlet cross-section.

In FIGS. 1 and 2, a component of a gas turbine in the form of a turbine blade twin 10 is shown in a schematic perspective view, or in a schematic sectional view, said turbine blade twin being fashioned in its basic shape approximately in the shape of a circular ring segment. In the present case, 23 such turbine blade twins 10 can be combined to form a turbine blade ring that can be situated in the high-pressure turbine part of a jet engine. This turbine blade ring, also called a vane ring, is situated fixedly inside the high-pressure turbine part, so that its turbine blades act as guide blades.

In the present case, turbine blade twin 10 comprises two turbine blades 12, 14, visible in section in FIG. 2. Here, the two turbine blades 12, 14 extend between a radially inner platform 16 and a radially outer platform 18. On the two front faces 20, 22 of turbine blade twin 10, inner platform 16 ends at front faces 24, 25, and outer platform 18 ends at front faces 26, 27. When viewed together with FIG. 2, it can be seen that all four front faces 22, 24, 25, 26 run at an identical angle of inclination α. Front faces 23 and 25, or 24 and 26, respectively allocated to each other, are here are arranged or oriented in such a way that overall the basic contour, having the shape of a circular ring segment, of turbine blade twin 10 results.

The outlet cross-section is a factor that influences engine power, and thus both operational safety and the specific fuel consumption. The outlet cross-section is also designated as the narrowest cross-section, or throat area, of guide blades 12, 14 acting as nozzles. This cross-section or throat area must lie within particular bounds, according to repair and assembly guidelines of the engine manufacturer. Therefore, it is necessary to be able to measure this outlet cross-section as precisely as possible.

On the basis of FIG. 2, we now first explain a closed outlet cross-section B that is bounded by corresponding bounding walls 27, 28 on the concave or, respectively, convex side of turbine blades 12, 14, or by bounding walls 29, 30 of the inner and of the outer platform 16, 18 at the outer circumference. This closed outlet cross-section B extends from the concave side of the one turbine blade 12 to the convex side of adjacent turbine blade 14 in a plane that runs perpendicular to the trailing direction shown by arrow 32, or to the corresponding outlet angle, at the height of an outlet edge 34 of turbine blade 12. The trailing direction indicated by arrow 32 results here as a tangent T to the concave side of turbine blade 12 at outlet edge 34.

In addition to closed outlet cross-section B, in turbine blade twin 10 there result two open outlet cross-sections A, C, each of which extends on the side of associated turbine blade 12, 14 toward the respective front face 20, 22 of turbine blade twin 10. Each of these open outlet cross-sections A, C is completed to form an overall, i.e. closed, outlet cross-section A, C by placing a turbine blade twin 10 adjacent to the respective turbine blade twin 10. However, because all turbine blade twins 10 have identical shapes, here it is useful to keep in mind that the two open outlet cross-sections A, C combine to form an overall outlet cross-section that then corresponds at least approximately to the surface of closed outlet cross-section B. However, because each turbine blade twin 10 is measured separately, not only closed outlet cross-section B between the two turbine blades 12, 14 is to be determined, but also the two open outlet cross-sections A, C, which then are also combined to form an overall outlet cross-section.

FIG. 3 shows a schematic perspective view of a mounting device 36 of a device with which the three outlet cross-sections A, B, C can be determined. Mounting device 36 comprises three seats 38, 40, 42 between which the two turbine blades 12, 14 can be positioned. In other words, turbine blade twin 10 can be positioned on mounting device 36 in such a way that center seat 40 extends into the intermediate space between the two turbine blades 12, 14. Accordingly, rear seat 38 comes into contact with the convex side of turbine blade 12, while front seat 42 comes into contact with the concave side of turbine blade 14. The three seats 38, 40, 42 can be adjusted relative to one another in such a way that a precise positional fixing of turbine blade twin 10 on mounting device 36 can be realized. Here, the surfaces of seats 38, 40, 42 coming into contact with turbine blades 12, 14 are correspondingly matched to the concave or convex sides thereof. This means that for example the rear side of front seat 42 is matched in its shape to the concave side of turbine blade 14, and the front side of seat 38 is matched in its shape to the convex side of turbine blade 12. In contrast, center seat 40 is matched both to the convex side of turbine blade 14 and also to the concave side of turbine blade 12.

In order to fix turbine blade twin 10 as a whole relative to seats 38, 40, 42, this twin is held down on mounting device 36 by an upper plate 44. For this purpose, upper plate 44 can be fastened to a lower part 46 that in turn rests together with mounting device 36 on a base plate 48. Here, upper plate 44 is supported on a collar 50 of inner platform 16 of turbine blade twin 10.

Figures 4, 5:
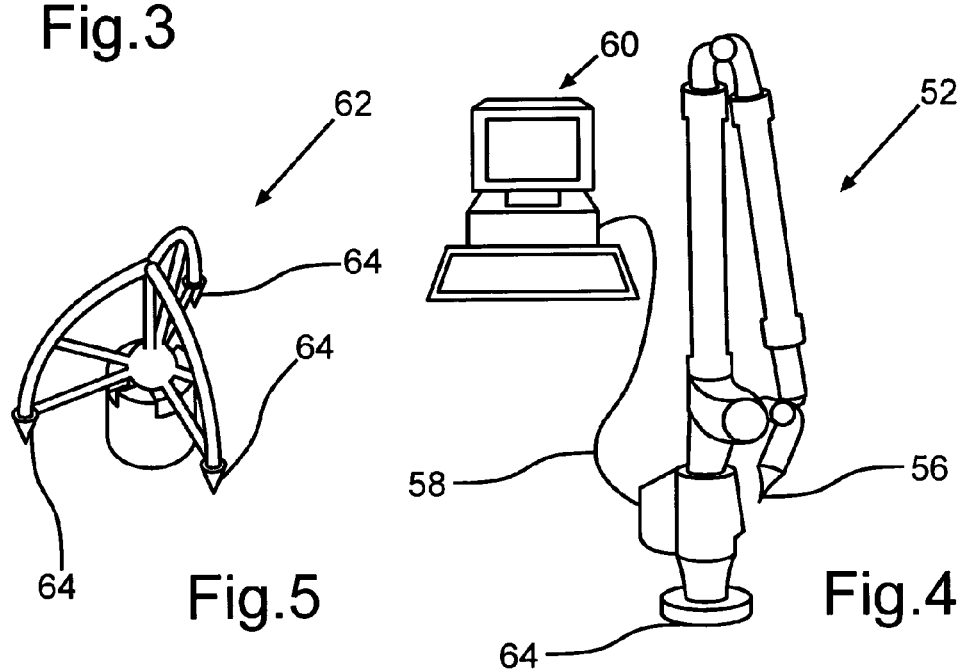
FIG. 4 shows a schematic perspective view of a measurement device by means of which a closed or open measurement line can be traversed or scanned along the bounding walls of the respective outlet cross-section, and by means of which a plurality of measurement points can be determined in the area of the front faces of the inner and outer platform of the component.
FIG. 5 shows a schematic perspective view of a calibrating cone with which the measurement device according to FIG. 4 is to be calibrated.

FIG. 4 shows a schematic and perspective side view of a measurement device 52, fashioned here as a multi-jointed measurement arm. Measurement device 52 has a base part 54 by means of which the device can be situated on base plate 48. In addition, measurement device 52 has a sensing head 56 by means of which turbine blade twin 10, or in particular in its outlet cross-sections A, B, C, can be measured in a way described in more detail below. Measurement device 52 is connected, for example via a line 58, to a computer unit 60 (shown only schematically) that is used to determine individual outlet cross-sections A, B, C in a manner described in more detail below.

In FIG. 5, a calibrating cone 62 can be seen that can be fastened to base plate 48. Calibrating cone 62 comprises three measurement points 64 via which measurement device 52 can be calibrated. A calibration of mounting device 36 can, in contrast, be carried out by affixing to turbine blade twin 10 a calibrating component corresponding to the shape thereof. In addition, in this way the positions in particular of outlet cross-sections A, B, C relative to measurement device 52 can be calibrated.

On the basis of FIGS. 6 and 7, the method for determining outlet cross-sections A, B, C of turbine blade twin 10 is now explained.

For this purpose, FIGS. 6 and 7 show, in a schematic, slightly perspectival front view or, respectively, in a slightly perspectival top view, turbine blade twin 10 fixed on mounting device 36. In order to determine open outlet cross-section A, first measurement device 52, or its sensing head 56, is used to determine four measurement points a, b, c, d in the area of the two end faces 23, 25 of the inner and of the outer platform 16, 18. Using these four measurement points a, b, c, d, computer unit 60 can be used to determine a plane E (FIG. 2) that determines front end face 20 of turbine blade twin 10. In other words, through the four measurement points a, b, c, d the exact planar end of turbine blade twin 10 on its front face 20 is determined.

In a following method step, measurement device 52, or its sensing head 56, is used to traverse or scan an open, U-shaped measurement line $m_1$ along the respective bounding walls 65, 66, 67 of open outlet cross-section A. For this purpose, sensing head 56 is guided from a starting point 68 to an end point 69, in a closed line. Sensing head 46 is guided along a planar stop 70 that is formed by the front face of front seat 42 of mounting device 36. In other words, the front face of front seat 42 is fashioned in such a way that this face runs perpendicular to the outlet angle, or in the plane of outlet cross-section 8. Accordingly, in order to traverse measurement line $m_1$ sensing head 56 can be guided in the corner area between stop 70 and bounding walls 65, 66, 67 of open outlet cross-section A. Starting point 68 and end point 69 of open measurement line $m_1$ are here situated on the respective front face 23, 25 of the appertaining platform 16, 18.

Using computer unit 60, during the traversing of measurement line $m_1$ associated measurement values are recorded, for example at measurement intervals.

The plane E calculated by computer unit 60, which is determined by measurement points a, b, c, d, and the surface of outlet cross-section A, determined by measurement line $m_1$, intersect in the area of a bounding line $b_1$. In other words, bounding line $b_1$ results from the line of intersection of the plane of the open outlet cross-section A and the plane E determined by measurement points a, b, c, d. Accordingly, the linear end of open outlet cross-section A can be unambiguously determined by boundary line $b_1$, so that the surface of outlet cross-section A can be unambiguously determined or indicated. The calculation both of plane E and also of outlet cross-section A take place in the present case using computer unit 60.

In order to calculate center closed outlet cross-section B, sensing head 56 is used to traverse or scan bounding walls 27, 28, 29, 30 on the outer circumference, along a circumferential measurement line $m_2$. This measurement line $m_2$ is in turn situated in the plane of outlet cross-section B. This plane is determined by a stop 71 that is formed by the front end face of center seat 40. In other words, the front end face of seat 40 is fashioned or situated in such a way that it lies precisely in the plane of closed outlet cross-section B. In this way, closed measurement line $m_2$ can easily be traversed using sensing head 56 by guiding this head in the corner area between stop 71 and limiting walls 27, 28, 29, 30, along a closed circumferential line. During the traversing or scanning of measurement line $m_2$, a plurality of measurement values are again recorded using computer unit 60; here the measurement intervals can be adjusted if warranted.

FIG. 7 shows the manner of determining open outlet cross-section C, which is situated on front face 22, opposite outlet cross-section A, of turbine blade twin 10. This takes place in a manner identical to the calculation or measuring of outlet cross-section A. Accordingly, first two measurement points a, b, c, d are determined on the upper and lower ends of end faces 24, 26 of the two platforms 16, 18. Again, this permits the determination of plane E, which in this case runs parallel to plane E situated on the other end face 20. Now, U-shaped open measurement line $m_3$ can in turn be traversed or scanned along the respective bounding walls 65, 66, 67 of outlet cross-section C, starting point 68 again being chosen in the area of the one front face and end point 69 being chosen in the area of the other front face 24, 26. In order to traverse measurement line $m_3$, the front face of seat 38 acts as stop 72, which runs in the plane of outlet cross-section C. Accordingly, sensing head 56 can again be moved in the corner area between stop 72 and bounding walls 65, 66, 67, along measurement line $m_3$.

After plane E has been calculated on the basis of measurement points a, b, c, d, and after measurement line $m_3$ has been calculated, computer unit 60 can again be used to calculate a bounding line $b_3$ along which plane E on front face 22 of turbine blade twin 10 intersects the plane of open outlet cross-section C. Accordingly, bounding line $b_3$ again indicates the linear end of the surface of outlet cross-section C.

Thus, overall it can be seen that through the determination of the two planes E on the two end faces 20, 22 of component 10, in each case a precise bounding line $b_1$, $b_3$ can be determined at which the surface of the respective open outlet cross-section A, C ends. If the two surfaces of the outlet cross-sections A, C are added together, there results at least approximately the surface of closed outlet cross-section B. The summation of the two open outlet cross-sections A, C is carried out in the present case by computer unit 60. Subsequently, the sum of the two outlet cross-sections A, C is summed with, or added to, closed outlet cross-section B. If a plurality, or all, turbine blade twins 10 of a turbine blade ring are measured, all outlet cross-sections can be summed in order to enable determination of an overall outlet cross-section.

Device 52, or its sensing head 56, are guided along measurement lines $m_1$, $m_2$, $m_3$ by hand in the present case. Measurement points a, b, c, d of the two planes E are also calculated by hand. However, it is to be considered as also contained within the scope of the present invention that sensing head 56 may also be guided automatically if warranted.

Overall, it is thus visible from the Figures that, making use of stops 70, 71, 72, the associated measurement lines $m_1$, $m_2$, $m_3$ can be traversed in relatively fast sequence using sensing head 56. The recording of measurement points a, b, c, d that takes place in each case before the calculation of measurement lines $m_1$ and $m_3$ can also take place very quickly, so that overall a method is created in which turbine blade twin 10 is measured, or outlet cross-sections a, b, c, can be determined by computer unit 60, in a time span of less than 30 seconds. The data output can take place using computer unit 60 in a simple manner for each simple component 10, or for the complete turbine blade ring.

It is also to be considered as being within the scope of the present invention that instead of the turbine blade twins 10 presented here, multiple turbine blade units having more than two turbine blades can also be measured. This may then result in a plurality of closed outlet cross-sections between each two adjacent turbine blades.

The invention claimed is:

1. A method for determining an outlet cross-section of a component comprising two turbine blades extending between an inner and an outer platform, the method comprising:
    measuring at least one closed outlet cross-section between the two turbine blades using a measurement device;
    measuring an open outlet cross-section between a side of each of the two turbine blades and a side of one of the inner and outer platforms using the measurement device; and
    determining a corresponding outlet cross-section by traversing one of an open and a closed measurement line along respective bounding walls.

2. The method as recited in claim 1, which includes recording measurement values using a computer unit during the traversing of the measurement line.

3. The method as recited in claim 1, which includes determining a measurement interval from measurement values recorded by a computer unit during the traversing of the measurement line.

4. The method as recited in claim 1, wherein determining the closed outlet cross-section includes traversing outer circumferential bounding walls of the closed outlet cross-section along a circumferential closed measurement line.

5. The method as recited in claim 1, wherein determining the open outlet cross-sections includes traversing their bounding walls along an open measurement line between starting points and end points, situated at a distance from one another, of the measurement line.

6. The method as recited in claim 2, wherein determining the open outlet cross-sections include determining a plane on each front face of the component by means of the computer unit and determining a respective bounding line of the respectively associated open outlet cross-section.

7. The method as recited in claim 6, which includes determining the planes via a plurality of respective measurement points in the area of the front faces of an inner and outer platform of the component.

8. The method as recited in claim 7, which includes determining measurement points in the area of the respective front faces of the inner and outer platform of the component before traversing the respectively associated open measurement line ($m_1$, $m_3$) of the corresponding open outlet cross-section.

9. The method as recited in claim 1, which includes moving the measurement device along the component by hand in order to determine at least one of the respective measurement lines and the plurality of measurement points in the area of the end faces of the platforms.

10. The method as recited in claim 1, which includes fixing the component by means of a mounting device before at least one of the determination of the measurement line and the determination of the plurality of measurement points.

11. The method as recited in claim 10, which includes defining the plane of each outlet cross-section by means of an associated stop of the mounting device.

12. The method as recited in claim 1, which includes summing the two open outlet cross-sections to form an overall outlet cross-section, after which a summation takes place with the at least one closed outlet cross-section.

13. A device for determining the outlet cross-section of a component including at least two turbine blades of a gas turbine extending between an inner and an outer platform, the device comprising:
a measurement device including an arm with a sensing device, said measurement device configured to move said sensing device over the blades and the inner and outer platforms and measure at least one closed outlet cross-section between the turbine blades and respective open outlet cross-sections between a side of one of said at least two turbine blades and a side of one of the inner and outer platforms, wherein bounding walls of the respective outlet cross-section are traversed by said sensing device along a measurement line; and
a computer unit programmed to evaluate the measurement line and determine a corresponding outlet cross-section.

14. The device as recited in claim 13, wherein the measurement device determines a plurality of measurement points of an appertaining plane on the front faces of the component, and wherein a respective bounding line of the associated open outlet cross-section is determined by the computer unit.

15. The device as recited in claim 13, further comprising a mounting device, wherein the mounting device and the measurement device are guided, by a user's hand.

16. The device as recited in claim 15, wherein the mounting device comprises at least one stop that runs perpendicular to an associated outlet angle and that extends in the plane of the respective outlet cross-section.

17. The device as recited in claim 16, wherein the mounting device has a separate stop for each outlet cross-section of the component.

18. The device as recited in claim 13, wherein the measurement device and the mounting device are calibrated by means of one of a calibrating cone or a calibrating component.

* * * * *